No. 814,471. PATENTED MAR. 6, 1906.
W. T. NICHOLLS.
MANUFACTURE OF SHEET OR PLATE GLASS.
APPLICATION FILED MAR. 25, 1905.
2 SHEETS—SHEET 1.
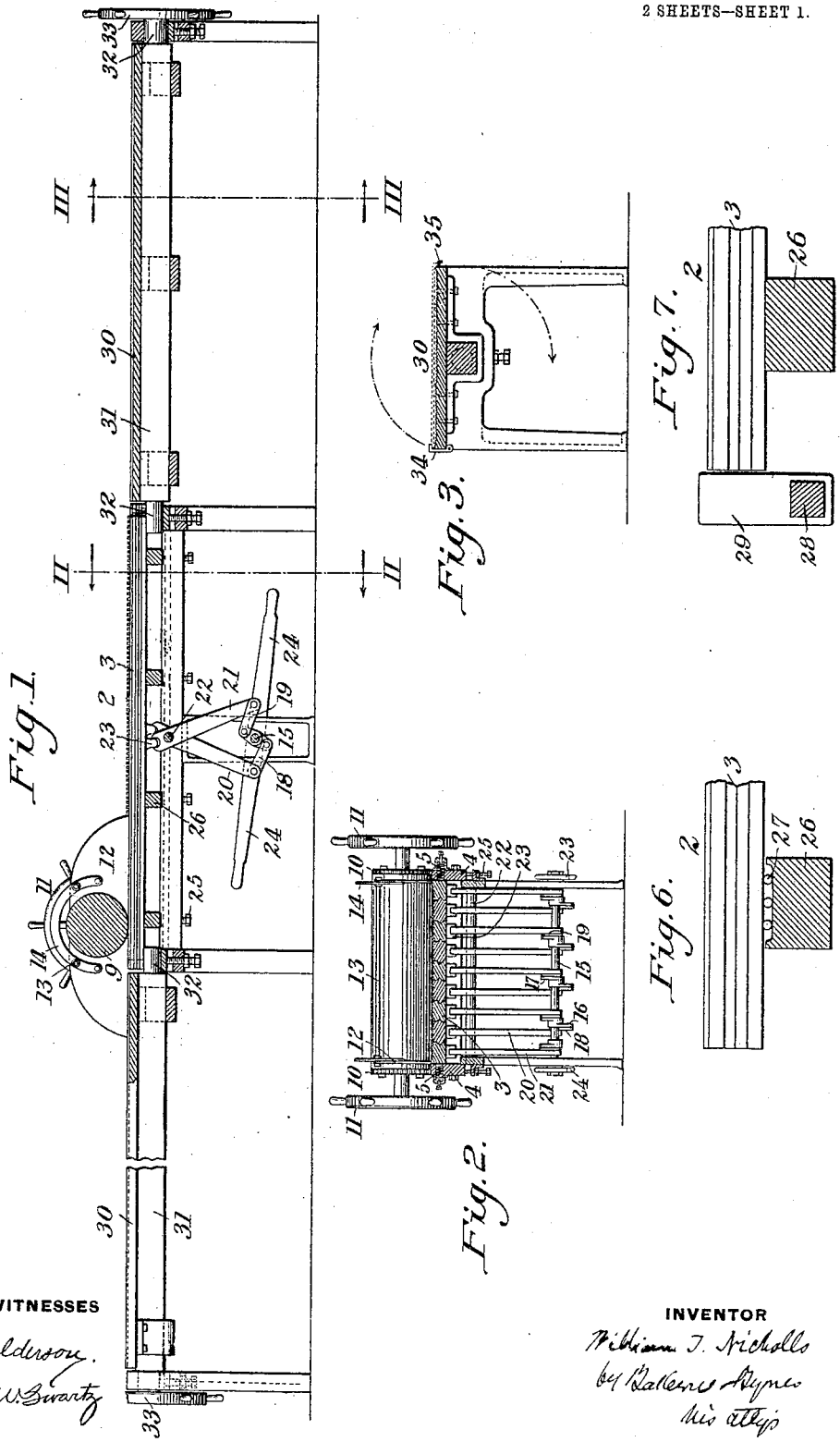
WITNESSES
INVENTOR No. 814,471. PATENTED MAR. 6, 1906.
W. T. NICHOLLS.
MANUFACTURE OF SHEET OR PLATE GLASS.
APPLICATION FILED MAR. 25, 1905.
2 SHEETS—SHEET 2.
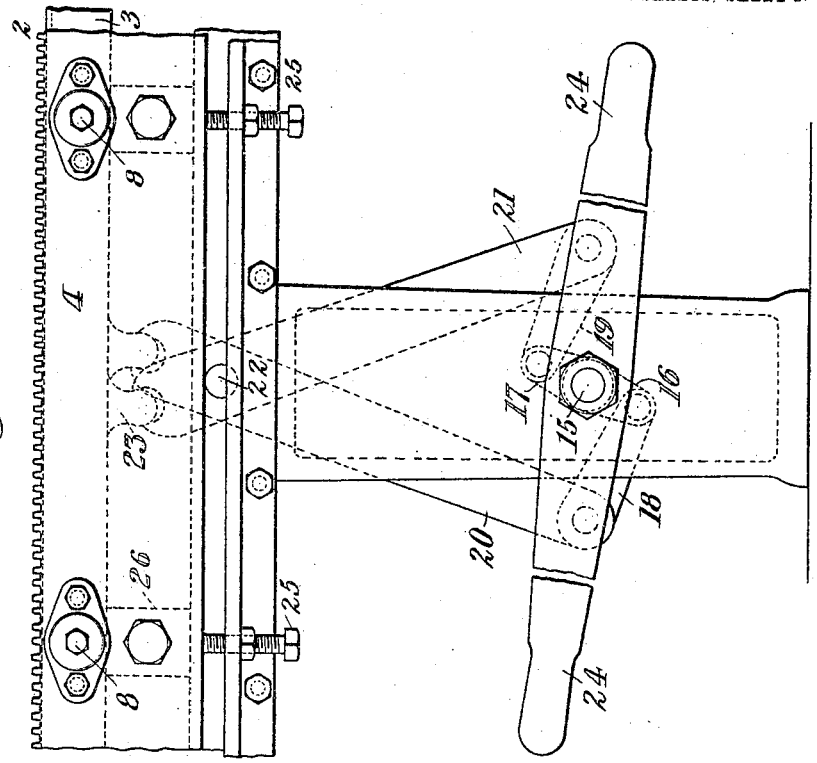
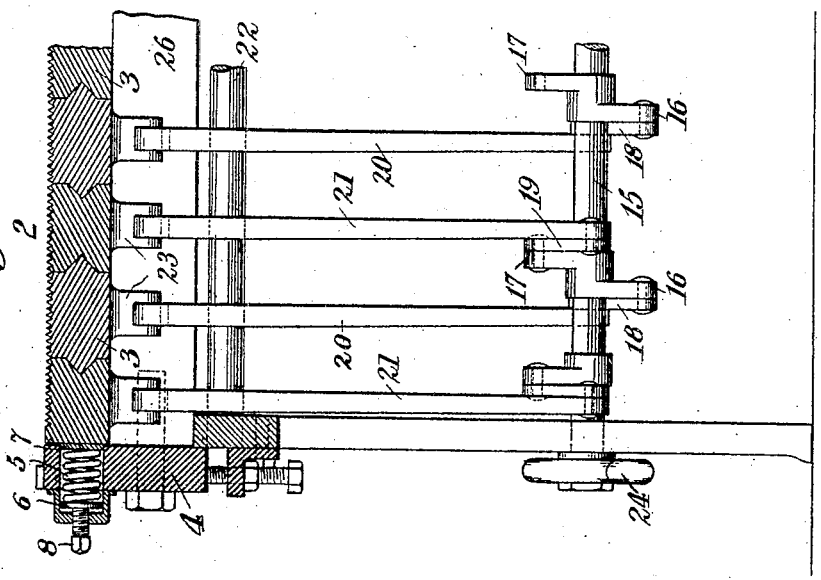
WITNESSES
INVENTOR
William T. Nicholls

UNITED STATES PATENT OFFICE.

WILLIAM T. NICHOLLS, OF WELLSBURG, WEST VIRGINIA.

MANUFACTURE OF SHEET OR PLATE GLASS.

No. 814,471.      Specification of Letters Patent.      Patented March 6, 1906.

Application filed March 25, 1905. Serial No. 251,985.

*To all whom it may concern:*

Be it known that I, WILLIAM T. NICHOLLS, of Wellsburg, Brooke county, West Virginia, have invented a new and useful Improvement in the Manufacture of Sheet or Plate Glass, of which the following is a full, clear, and exact description, reference being had to the accompanying drawings, forming part of this specification, in which—

Figure 1 is a sectional side elevation of apparatus constructed in accordance with my invention. Figs. 2 and 3 are vertical cross-sections on the lines II II and III III, respectively, of Fig. 1. Fig. 4 is an enlarged partial cross-section of the rolling-table. Fig. 5 is an enlarged partial side elevation of the same, and Figs. 6 and 7 are detail views hereinafter referred to.

In the rolling of sheet or plate glass on a rolling-table the glass sheet or plate adheres to the table after the rolling operation. In the case of glass having a plain lower face it is loosened from the table by passing a sword between the plate and the table before lifting off the glass. In the case of glass having prisms or other designs or patterns formed on its lower face by corresponding patterns on the table the sword cannot be used, as it would disfigure the pattern. Prism-glass and glass having figures or patterns thereon has heretofore been formed by impressing the prism formation or other pattern upon the upper surface of the rolled sheet. This method involves many difficulties and makes the glass expensive.

My invention is designed to overcome these difficulties and provide for the making of plate or sheet glass with patterns or designs on its under side lying on the table.

The invention consists in jarring or jiggling the glass to loosen it on the table before removing the plate and, further, in reversing the plate for feeding into the leer, so that the rolled face of the glass will be on the under side in passing through the leer.

The invention also consists in the features hereinafter more fully described and claimed.

In the drawings, in which I show a preferred form of apparatus for carrying out my invention, 2 is a rolling-table, which is made up of longitudinal sections or strips 3. In order to hold the upper faces of the sections in proper vertical alinement, I preferably form their adjacent faces with an interfitting rib and recess, as shown. The rib and recess may of course be varied in form and other means may be employed for holding the sections in proper alinement. The upper faces of these sections are provided with projecting ribs and recesses, if prism-glass is to be made, or are provided with any suitable pattern or figure which it is desired to imprint upon the face of the rolled sheet.

The side rack-bars 4 are preferably formed separately from the table-sections and are secured in any suitable manner, preferably leaving a small space of a fraction of an inch between the inner face of the rack and the outer face of the adjacent table-section. This allows the table to expand under the heat of rolling without injuring it. To hold the sections together against sidewise separation, I preferably employ springs 5, having followers 6 and 7 and extending through holes in the rack-bars. The followers 7 press against the outer face of the outer table-section, while the followers 6 may be adjusted by set-screws 8. The tension may thus be adjusted to properly hold the sections in place, while allowing the slight relative endwise movement hereinafter described.

The roller 9 may be of the usual type, having gear-wheels 10, traveling on the racks and provided with hand-wheels 11. The shoes or plows 12 may be of any desirable form, and I have shown them as double-ended, so that glass may be rolled while the roller is moving in either direction. I have shown the shoes as connected by the cross-bolts 13 to stiffen and hold them in place. The shoes on one side are also connected with those on the other side by the arch-shaped stiffeners 14.

Below the central part of the table is supported a transverse rock-shaft 15, having rock-arms 16 and 17 projecting therefrom in different directions. These rock-arms are connected by pivotal links 18 and 19 to the lower ends of levers 20 and 21, fulcrumed upon a transverse rod or shaft 22. The upper end of each lever is slotted to receive a lug 23, projecting down from the central portion of each table-section. The shaft 15 may be rocked in any suitable manner, and I have shown hand-levers 24 for this purpose. Set-screws 25 are used to adjust the rack-bars to provide for rolling different thicknesses of sheets. The table-sections are shown as supported upon transverse beams or supports 26, and to reduce the friction in the slight endwise movement of the table-sections I may employ roller-bearings 27 on the beams 26, as shown in Fig. 6. These rollers would rest in raceways extending transversely of the beams and longitudinally of the table-sections under each section.

In using the table the glass is teemed in front of the roller and rolled out into a plate or sheet in the ordinary manner. In this operation if the table is figured or provided with a pattern or prism formation the sheet or plate will be correspondingly formed on its lower face. After the rolling is completed the rock-shaft is rocked in opposite directions to a slight degree, thus causing each table-section to move in the opposite direction to the adjacent sections. This jiggling movement will loosen the glass from the sections, so that it may be readily drawn from the table. In order to further facilitate the loosening, if the glass sticks to any one of the sections I may employ a transverse bar or squared shaft 28 at one end of the table, having a sliding stop 29. This stop may be slid along the shaft 28 into alinement with any one of the table-sections, so that when the slight endwise movement is imparted the section will be jarred by striking against the stop, thus effectually loosening the glass. The stop may be slid to one side of the table when not in use or may be arranged to swing down out of the way.

After the glass is loosened on the rolling-table it is drawn from either end onto either one of a pair of tables 30, which are in endwise alinement with the rolling-table. If prism-glass is being formed, the receiving-tables 30 are preferably ribbed on their upper faces, the ribs and grooves being in alinement with those of the rolling-table. The prisms formed are thereby kept intact. Each of the tables 30 is secured to a longitudinal rock-shaft 31, having trunnions 32 projecting beyond its ends and carried in suitable bearings, one of the trunnions having a hand-wheel 33. The sides of the tables are provided with suitable clamps (shown at 34 and 35 in Fig. 3) by which the glass may be held on the table while it is turned over. The table is then reversed in position, with the glass held to its face, and a suitable truck or carrier is run in beneath the table. The table-clamps then being released, the sheet or plate of glass is lowered on the truck or carrier, with its flat rolled face on the bottom. It is then taken to the leer and pushed in in the ordinary manner. As the flat face of the glass rests on the leer-supports, the prisms or other patterns are not injured in the operation.

By providing a receiving-table at both ends of the roller-table and using double shoes I am enabled to increase the output, since glass may be rolled while moving the roller in both directions, the sheets being drawn alternately upon one table and then upon the other.

The advantages of my invention result from providing means for jarring or jiggling the glass loose to destroy its adhesion to the table without injuring the pattern or figure formed by the table. I am thus enabled to roll prism-glass or figured glass cheaply and provide a large output.

The table-grooves for prisms may extend transversely or diagonally, in which case the table-sections will of course extend parallel with the direction of the grooves. Instead of employing the jiggling-sections, as shown, various means may be provided for jarring the table to loosen the sheet. The glass may be figured or provided with a pattern on its top face by the roller, and many other changes may be made in the form and arrangement of the apparatus without departing from my invention.

I claim—

1. The method of forming plate-glass with a pattern consisting in rolling a sheet or plate of glass on a table having the desired pattern, and then jarring or jiggling the plate loose; substantially as described.

2. The method of forming prism-glass, consisting in rolling a sheet or plate and simultaneously forming prisms on the table-face of the sheet, and then oscillating the table-sections to loosen the glass; substantially as described.

3. The method of making figured or patterned glass, consisting in rolling the glass on a table, and simultaneously forming the figure or pattern on its table-face, loosening the sheet and drawing it endwise on another table, turning the latter table over to reverse the position of the sheet, and then feeding it through the leer with its figured side uppermost; substantially as described.

4. The method of forming figured glass, consisting in rolling it on a table having sections and simultaneously forming the figures on its table-face, and then moving the table-sections to jiggle or jar the glass loose and removing the sheet; substantially as described.

5. The method of forming prism-glass, consisting in rolling the glass on a table, and simultaneously forming prisms on its lower or table face, and then oscillating adjacent sections of the table in opposite directions, and removing the sheet; substantially as described.

6. The method of forming plate-glass, consisting in rolling the glass in one direction on a table, drawing it to a receiving-table at one end, then rolling another plate, moving the roller in another direction, and withdrawing the second plate on a receiving-table at the other end from that of the first receiving-table; substantially as described.

7. The method of forming plate-glass with a pattern, which consists in rolling it on a sectional table having the desired pattern, and then jarring or jiggling the table-sections to loosen the plate; substantially as described.

8. A table for rolling glass, in combination with mechanism for jarring or jiggling the same; substantially as described.

9. A glass-rolling table formed in sections, and mechanism for jarring or jiggling the sections to loosen the glass; substantially as described.

10. A glass-rolling table formed in sections, having rib and grooved junctures, and means for jarring or jiggling the sections; substantially as described.

11. The combination with a fixed rolling-table having a figured or patterned upper surface, of an invertible receiving-table adjacent thereto, and to which the rolled sheet or plate is transferred, and means for holding the sheet to the receiving-table; substantially as described.

12. A table for rolling glass having a figure or pattern on its upper face, and mechanism for jarring or jiggling the table to loosen the glass; substantially as described.

13. A rolling-table having invertible receiving-tables at both ends, in combination with a roller having a double-ended shoe or plow; substantially as described.

14. A glass-rolling table formed in sections, means for effecting the longitudinal movement of the sections relatively to each other, and means for jarring one or more of said sections; substantially as described.

In testimony whereof I have hereunto set my hand.

W. T. NICHOLLS.

Witnesses:
JOHN MILLER.
H. M. CORWIN.